United States Patent [19]
Amino et al.

[11] Patent Number: 6,058,994
[45] Date of Patent: May 9, 2000

[54] RUBBER COMPOSITION FOR TIRE-TREAD HAVING HIGH FRICTIONAL FORCE ON ICE AND PNEUMATIC TIRE USING SAME

[75] Inventors: Naoya Amino; Yoichi Yamaguchi; Masayoshi Daio, all of Hiratsuka, Japan

[73] Assignee: The Yokohama Rubber Co., Ltd., Tokyo, Japan

[21] Appl. No.: 09/079,171

[22] Filed: May 15, 1998

[30] Foreign Application Priority Data

| | | | |
|---|---|---|---|
| May 19, 1997 | [JP] | Japan | 9-128779 |
| Nov. 18, 1997 | [JP] | Japan | 9-317123 |

[51] Int. Cl.$^7$ .............. B60C 7/22; B60C 27/00; C08J 9/32
[52] U.S. Cl. ............ 152/167; 152/209 R; 152/210; 152/211; 152/169
[58] Field of Search ............ 521/54, 150, 149; 152/167, 169, 209 R, 209, 210, 211

[56] References Cited

U.S. PATENT DOCUMENTS

| | | | |
|---|---|---|---|
| 3,864,181 | 2/1975 | Wolinski et al. | 521/54 |
| 4,108,806 | 8/1978 | Cohrs et al. | 521/55 |
| 4,320,076 | 3/1982 | Greenwood | 521/54 |
| 4,946,737 | 8/1990 | Lindeman et al. | 521/54 |
| 4,959,395 | 9/1990 | Janda | 521/54 |
| 5,665,785 | 9/1997 | McClellan et al. | 521/143 |

FOREIGN PATENT DOCUMENTS

| | | |
|---|---|---|
| 2-170840 | 7/1990 | Japan . |
| 4-246440 | 9/1992 | Japan . |

*Primary Examiner*—Morton Foelak
*Attorney, Agent, or Firm*—Arent Fox Kintner Plotkin & Kahn, PLLC

[57] ABSTRACT

1. A rubber composition for a tire tread containing: (i) 100 parts by weight of a diene rubber, and (ii) 1 to 20 parts by weight of an elastic gas-encapsulated thermoplastic resin hollow particle having a particle size of 5–300 μm, which is obtained by expanding, upon heating during vulcanization, a thermally expansible thermoplastic resin containing an encapsulated liquid or solid substance capable of generating a gas by vaporization, decomposition or chemical reaction upon heating to form the hollow-type expanded particle and, optionally containing (iii) 1 to 20 parts by weight of a short fiber or (iv) 1 to 20 parts by weight of a hard particle.

15 Claims, 2 Drawing Sheets

RUBBER COMPOSITION FOR TIRE-TREAD HAVING HIGH FRICTIONAL FORCE ON ICE AND PNEUMATIC TIRE USING SAME

BACKGROUND OF THE INVENTION

1. Field of the Invention

The present invention relates to a rubber composition for a tire tread. More specifically it relates to a rubber composition for a tire tread having a high frictional force on ice and a pneumatic tire using the same as a tread portion thereof.

2. Description of the Related Art

Various proposals have been made heretobefore to formulate a hard foreign substance or a hollow particle into a rubber to thereby form a micro irregularity on the surface of a rubber layer, whereby a water-film present on the surface of the ice is removed during a running of a tire and the friction on the ice is increased, but practically satisfactory results have not been obtained yet. Examples of such proposals are disclosed in, for example, JP-A(Kokai)-60-258235 (i.e., micropowder of ceramic), JP-A-2-274740 (i.e., finely divided plant), and JP-A-281052 (i.e., fine metal particle). However, according to these proposals, there are caused other problems such as the increase in the hardness of the rubber and the loss of flexibility of the rubber whereby the resultant tire is difficult to follow the contours of the road. Typical examples of formulating hollow particles are disclosed in JP-A-2-170840, JP-A-2-208336 and JP-A-4-5543. However, these proposals have problems that the hardness of the rubber is also increased and that the hollow particles are broken during the mixing thereof.

SUMMARY OF THE INVENTION

Accordingly, the objects of the present invention are to eliminate the above-mentioned problems in the prior art and to provide a rubber composition for a tire tread having a high frictional force on ice without impairing the desired properties such as the hardness and the flexibility of rubber.

Another object of the present invention is to provide a process for producing the rubber composition for a tire tread.

A further object of the present invention is to provide a pneumatic tire having an excellent frictional force on ice.

Other objects and advantages of the present invention will be apparent from the following description.

In accordance with the present invention, there is provided a rubber composition for a tire tread comprising:

(i) 100 parts by weight of a diene rubber, and (ii) 1 to 20 parts by weight of an elastic gas-encapsulated thermoplastic resin hollow particle having a particle size of 5–300 µm, which is obtained by expanding, upon heating during vulcanization, a thermally expansible thermoplastic resin containing an encapsulated liquid or solid substance capable of generating a gas by vaporization, decomposition or chemical reaction upon heating to form the hollow-type expanded particle.

In accordance with the present invention, there is also provided a rubber composition for a tire tread comprising, in addition to the above-mentioned components (i) and (ii), (iii) 1 to 20 parts by weight, based on 100 parts by weight of the diene rubber, of a short fiber having an average diameter of 0.1 µm or more and an average length of 50 to 5000 µm, and/or (iv) 1 to 20 parts by weight, based on 100 parts by weight of the diene rubber, of a hard particle having a Vickers hardness of 35–1000 and a particle size of 20–500 µm.

In accordance with the present invention, there is further provided a process for producing a rubber composition for a tire tread comprising:

uniformly mixing (i) a diene rubber with (ii) a thermally expansible thermoplastic resin particle containing an encapsulated liquid or solid substance capable of generating a gas by evaporation, decomposition or chemical reaction upon heating, at a temperature of less than an expansion starting temperature, and further optionally with (iii) a short fiber and/or (iv) a hard particle;

heating the resultant mixture at a temperature of the expansion starting temperature of the expansible thermoplastic resin particle to form an elastic gas-encapsulated expanded thermoplastic resin hollow particle having a particle size of 5–300 µm uniformly dispersed in the rubber.

In accordance with the present invention, there is still further provided a pneumatic tire, in which a tread portion thereof is composed of the rubber composition as mentioned above.

BRIEF DESCRIPTION OF DRAWINGS

The present invention will now be explained in further detail with reference to the drawings, wherein.

DESCRIPTION OF PREFERRED EMBODIMENTS

Figure 1:
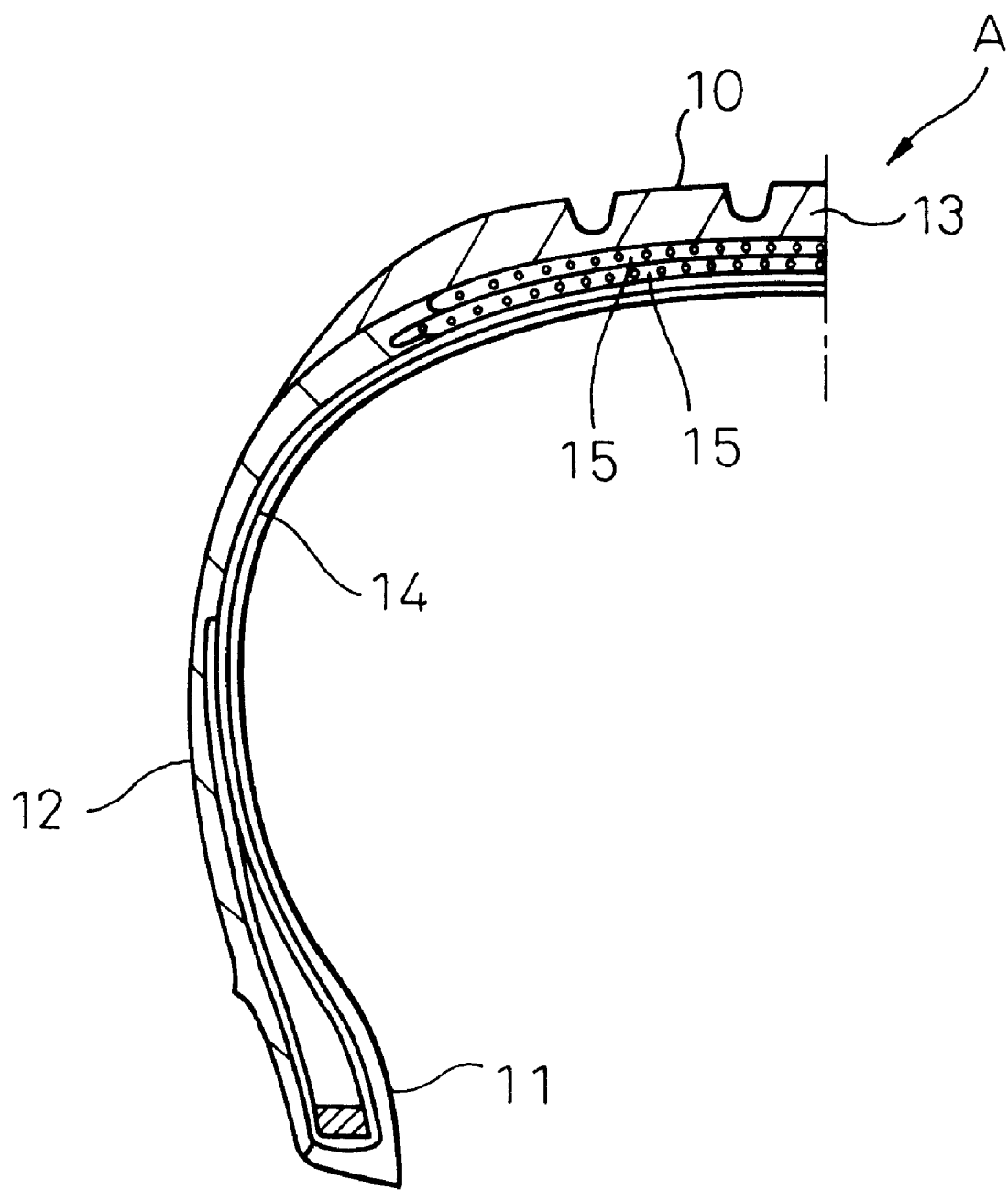
FIG. 1 is a half cross-sectional view along the meridian of an example of a pneumatic tire according to the present invention.

The rubber composition for a tire tread according to the present invention contains an elastic gas-encapsulaled thermoplastic resin hollow particles having a particle size of 5–300 µm is uniformly contained in a cured diene rubber. Such a rubber composition for a tire tread can be obtained by (i) uniformly mixing a diene rubber with a thermally expansible thermoplastic resin particle containing an encapsulated liquid or solid substance capable of generating a gas by evaporation, decomposition or chemical reaction upon heating, at a temperature of less than an expansion starting temperature; and (ii) heating the resultant mixture at a temperature of the expansion starting temperature of the expansible thermoplastic resin particle to form an elastic gas-encapsulated expanded thermoplastic resin hollow particle having a particle size of 5–300 µm uniformly dispersed in the rubber.

The elastic gas-encapsulated thermoplastic resin hollow particles can be obtained, as mentioned above, by heating a thermally expansible thermoplastic resin particle containing a liquid or solid substance therein capable of generating a gas by evaporation, decomposition or chemical reaction upon heating at a temperature of the expansion starting temperature or less, normally 140° C.–190° C., whereby the generated gas is included as separate cells in the shell composed of the thermoplastic resin. The resultant elastic gas-encapsulated thermoplastic resin hollow particles have a particle size of 5–300 µm, preferably 10–200 µm.

The volume ratio of the hollow portions contained in the elastic gas-encapsulated thermoplastic resin hollow particles is preferably 5–35%, more preferably 6–30%, particularly preferably 7–25% more particularly preferably 8–20%.

When the volume ratio is too small, the frictional power on ice is not sufficiently improved. Contrary to this, when the volume ratio is too large, the abrasion resistance tends to decrease, whereby the practically tends to be impaired.

The above-mentioned thermally expansible thermoplastic resin particles (i.e., non-expanded particles) are commercially available. Examples of such a commercially available product are EXPANCEL 091DU-80 or 092DU-120 (Expansible (Non-expanded) Particle (Expancel Co. in Sweden)) or MATSUMOTO MICROSPHERE-F-85 or F-100 (Expansible (Non-expanded) Particle (Matsumoto Yushi K.K. in Japan)).

The thermoplastic resins constituting the outer shell component of the above-mentioned gas-encapsulated thermoplastic resin particles are preferably those providing an expansion starting temperature of preferably 100° C. or more, more preferably 120° C. or more and a maximum expansion temperature of 150° C. or more, more preferably 160° C. or more. Examples of such thermoplastic resins are preferably (meth)acrylonitrile polymers, copolymers having a high (meth)acrylonitrile content. Examples of the comonomer of the above-mentioned (meth)acrylonitrile copolymers are vinyl halides, vinylidene halides, styrene monomers, (meth)acrylate monomers, vinyl acetate, butadiene, vinyl pyridine, chloroprene. Note that the above-mentioned thermoplastic resins may be made crosslinkable with a crosslinking agent such as divinylbenzene, ethylene glycol di(meth)acrylate, triethylene glycol di(meth)acrylate, trimethylol propane tri(meth)acrylate, 1,3-butylene glycol di(meth)acrylate, allyl(meth)acrylate, triacrylformal, triallylisocyanurate. The crosslinking agent is preferably present in the uncrosslinked state, but may be partially crosslinked to such an extent that the properties as the thermoplastic resins are not impaired.

Examples of the liquid or solid substances capable of generating a gas by vaporization, decomposition or chemical reaction upon heating, usable in the present invention, are liquid substances such as hydrocarbons such as n-pentane, isopentane, neopentane, butane, isobutane, hexane, petroleum ether; chlorinated hydrocarbons such as methyl chloride, methylene chloride, dichloroethylene, trichloroethane, trichloroethylene, or solid substances such as azodicarbonamide, dinitrosopentamethylenetetramine, azobisisobutyronitrile, toluenesulfonylhydrazide derivatives, aromatic succinyl hydrazide derivatives.

Examples of diene rubber usable in the rubber composition according to the present invention are natural rubber (NR), various butadiene rubbers (BR), various styrene-butadiene copolymer rubbers (SBR), polyisoprene rubber (IR), acrylonitrile butadiene rubbers (NBR), chloroprene rubber (CR), ethylene-propylene-diene copolymer rubbers (EPDM), styrene-isoprene copolymer rubbers, styrene-isoprene-butadiene copolymer rubbers, isoprene-butadiene copolymer rubbers. The diene rubbers, when used as a fire tread according to the present invention, are preferably those having a glass transition temperature (Tg) of −55° C. or less on average, more specifically −60° C. to −100° C. on average, in order to improve the balanced properties of the low rolling resistance with the abrasion resistance and the low temperature performances.

According to the preferable embodiment of the present invention, 1 to 20 parts by weight, more preferably 2 to 15 parts by weight, based upon 100 parts by weight of the rubber, of the elastic gas-encapsulated thermoplastic resin hollow particle is further formulated into the rubber composition mentioned above.

FIG. 1 is a half cross sectional view along the meridian of a pneumatic tire according to the present invention.

Figure 2:
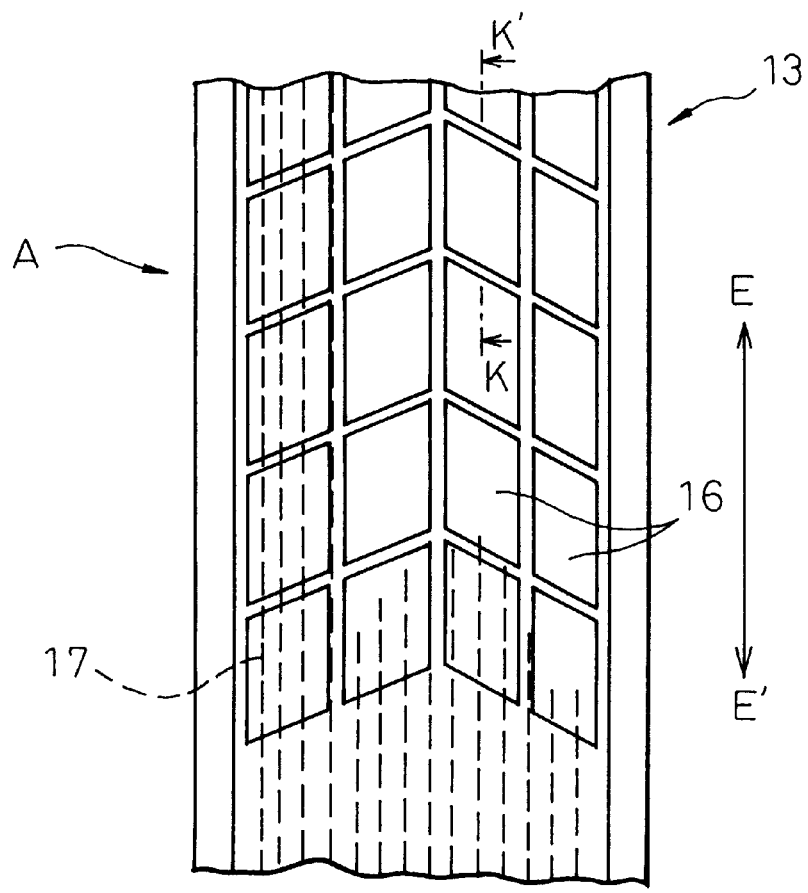
FIG. 2 is a schematic plan view of a tread portion of an example of a pneumatic tire according to the present invention.
Figure 3:
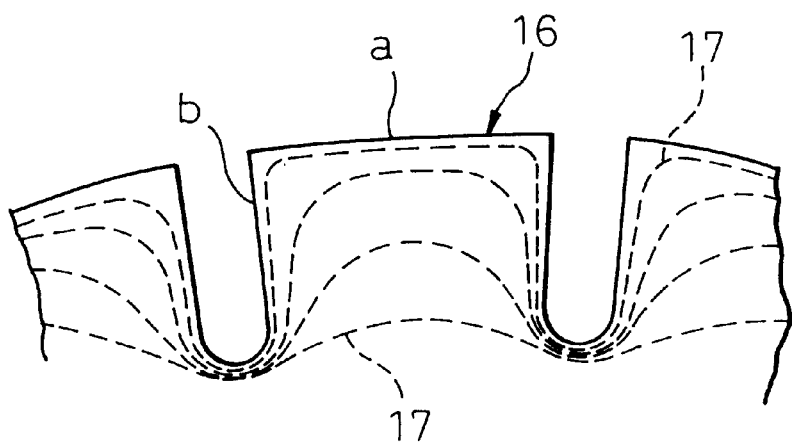
FIG. 3 is a K–K' cross-sectional view of the example of a pneumatic tire of FIG. 2 according to the present invention.

In FIG. 1, the pneumatic tire A according to the present invention comprises a pair of the left and right side of the bead portions 11, 11, a pair of the left and right sides of the side wall portions 12, 12 connected to the bead portions 11, 11, and the tread portion 13 located between the side wall portions 12 and 12. The carcass layer 14 is arranged between a pair of the left and right sides of the bead portions 11 and 11 and, in the tread portion 13, the belt layer 15 is placed so as to cover the outer circumference thereof. 10 is a surface of the tread. Note that, in this embodiment of the present invention, the tread portion 13 is composed of the rubber, the gas-encapsulated thermoplastic resin hollow particles, and the short fiber. The short fiber should be oriented along with the front surface and the side surface of a block in the present invention, as shown in, for example, FIGS. 2 and 3. FIG. 2 is a schematic plan view of a tread portion of an example of a pneumatic tire according to the present invention and FIG. 3 is a K–K' cross sectional view thereof. As shown in FIGS. 2 and 3, the short fiber 17 is oriented in the direction EE' of a tire circumference along the front surface a are the side surface of the block 16 of the tread portion.

In order to obtain such an orientation of the short fiber, the tendency of the fiber is utilized such that the fiber having a certain length/diameter ratio tends to align in the flowing direction of a matrix (i.e., rubber) during the extrusion molding of the tread portion 13. This tendency causes the flow of the unvulcanized tread rubber along with the mold by the projection portions of the mold when the tire is vulcanized. As a result, the short fiber 17 is oriented along the projection portions of the mold. Thus, the short fiber 17 is oriented along the front surface a and the side surface b of the block 16 of the tread portion 13. However, when the short fiber 17 is too short in the length thereof, the short fiber is randomly arranged, and therefore, no orientation of the short fiber 17 does not occur.

The block 16 containing the short fiber 17 oriented along with the front surface a and the side surface b as mentioned above exhibit the anisotropic elastic modulus, namely the rigidity of the overall block is extremely high, but the elastic modulus in the direction at the right angle from the orientation direction (i.e., the elastic modulus in the inside direction from the surface) is not so high. Due to the generation of this anisotropic elastic modulus, the rigidity of the block composed of the soft base rubber having a high cohesive effect can be reinforced, and therefore, the block edge effects and the rubber cohesive effects can be compatible together at the maximum degree, the tire performances not only on the ice and snow road but also on the general road can be improved. For this reason, in the present invention, the short fiber 17 is preferably oriented such that the dynamic Young's modulus $E_1$ in the circumference direction of the block and the dynamic Young's modulus $E_2$ in the radial direction of the block satisfy the follow equations (1) and (2):

$$1.03 \leq E_1/E_2 \qquad (1)$$

$$3(\text{MPa}) \leq E_2 \leq 20(\text{MPa}) \qquad (2)$$

The above-mentioned short fiber preferably has an average diameter of 0.1 μm or more, more preferably 0.1 to 50 μm and an average length of 50–5000 μm, more preferably 100–2000 μm. The preferable ratio of the length/the diameter is 10–1000, more preferably 100–1000. Examples of the short fibers usable in the present invention are those natural fibers such as cotton and silk, chemical fibers such as cellulose fibers, polyamide fibers (e.g., nylon fibers), polyester fibers, polyvinyl alcohol fibers (e.g., vinylon), inorganic fibers such as carbon fibers. Preferably, the use of the short fiber of cellulose (e.g., rayon). Metallic short fibers such as steel short fiber, copper short fiber may also be used. Furthermore, to increase the dispersibility in the rubber, surface-treated short fibers or fibers in the form of a masterbatch previously dispersed in SBR, NR, etc. may be preferably used.

According to the preferable Embodiment of the present invention, 1 to 20 parts by weight of a hard particle, based upon 100 parts by weight of the rubber, is further formulated into the rubber composition. The hard particles used in the present invention are intended to be formulated into the rubber composition to thereby obtain the scratch effect against the ice surface. For this reason, the hard particles preferably have a hardness of higher than ice (i.e., a Vickers hardness Hv of about 30 but lower than asphalt (i.e., Hv of about 1000), i.e., a Vickers hardness of 35 to 1000, more preferably 40 to 800 and a preferable average particle size of 20 to 500 μm, more preferably 40 to 200 μm. When the particle size of the hard particle is less than 20 μm, the scratch effect against the ice is not sufficient, whereas when the particle size is more than 500 μm, the actual contact area with the ice surface becomes too small, and therefore, the friction force on the ice tends to be unpreferably small.

The materials usable, as the above-mentioned hard particles, in the present inventions are those having the above-mentioned hardness range. Among these, carbonaceous powder particles such as wood ceramics particles, activated carbon particles; hard synthetic resin particles such as those of nylon resins, polyethylene resins, phenol resins; metal particles of, for example, aluminum, copper, and iron; mineral powders such as those of calcite and fluorite. These particles may also be used in any mixture thereof.

The rubber composition for a tire tread according to the present invention contains, as a reinforcing agent, carbon black and/or silica formulated therein. The carbon blacks used for the rubber composition according to the present invention are preferably those having a nitrogen specific surface area ($N_2SA$) of at least 70 $m^2/g$, more preferably 80 to 200 $m^2/g$, and a DBP (i.e., dibutyl phthalate) oil absorption of at least 105 ml/100 g, more preferably 110 to 150 ml/100 g. When the values of $N_2SA$ and DBP oil absorption are too small, the tensile strength and modulus of the rubber composition unpreferably tend to decrease. Contrary to this, when the $N_2SA$ is too large, the heat generation unpreferably tends to increase. The carbon black having a too large DPB oil absorption is difficult to produce.

In the case of the silica, precipitated silica (hydrous silica), pyrogenic silica (anhydrous silica) and surface-treated silica may be used. Among these types of silica, precipitated silica is preferably used.

The amount of these reinforcing agents to be formulated are preferably, based upon 100 parts by weight of the rubber in the rubber composition, 20 to 80 parts by weight, of carbon black and 0–50 parts by weight of silica. Silica is not necessary to use in the rubber composition according to the present invention. When the silica is used in the rubber composition, it is preferable to use in such an amount that the balance of tanδ is improved. When the amount of silica is too large, the electric conductivity tends to decrease and the cohesive force of the reinforcing agent tends to become strong, whereby the dispersibility during the mixing tends to be insufficient.

The rubber composition for a tire tread according to the present invention may optionally contain any compounding agents normally used in the rubber industry, for example, vulcanization or crosslinking agent, various oils, an antioxidant, a vulcanization accelerator, a filler, a plasticizer, a softening agent. The amounts of these compounding agents may be any conventional amount unless the objects of the present invention are impaired.

The mixing and the premolding of the thermally expansible thermoplastic resin particles in the rubber composition for a tire tread according to the present invention are carried out at a temperature of less than expansion starting temperature, preferably a temperature of less than, by at least 10° C., more preferably at least 15° C., the expansion starting temperature. Otherwise, a part of the thermally expansible resin particles is expanded at this stage, of which expanded particles in turn tend to be collapsed. After the mixing and the premolding, the premolded product is heated at a temperature of not less than the expansion starting temperature of the thermally expansible thermoplastic resin particles contained in the premolded product to thereby mold the premolded product. The heat molding temperature is preferably carried out at a temperature of ±20° C. of the maximum expansion temperature Tmax of the thermally expansible resin particles, more preferably Tmax−20° C. to Tmax+5° C., so that the sufficient expansion can be achieved and that the optimum physical properties of the rubber material can be exhibited. It should be noted that, during the above-mentioned heating, the rubber component constituting the matrix is vulcanized and hardened. The weight of the thermally expansible resin particle is only slightly changed even after expanded to form the gas-encapsulated thermoplastic hollow resin particles.

As a result of the above heat molding and vulcanization, the rubber molded product having a structure such that the gas-encapsulated thermoplastic resin particles in the form of a spherical shell having a size of 5–300 μm is uniformly and three-dimensionally dispersed in the matrix of the vulcanized rubber can be obtained. When the hard particles are used, the hard particles having a size of 20–500 μm are also uniformly and three-dimensionally dispersed in the matrix of the vulcanized rubber.

When the rubber composition for a tire tread having the structure obtained above is used as a pneumatic tire, the gas-encapsulated thermoplastic resin particles (and the hard particles) appear on the top of the tread surface as the tread portion is worn due to the above-mentioned structure. Thus, a large number of the projected portions are formed on the surface of the tread portion. At the same time, a large number of the graved portions are also formed due to the removal of the particles from the tread surface. Thus, the water-film on the ice is effectively removed therefrom, whereby the actual contactness is improved and the friction performance on the ice is improved. Furthermore, since the elastic gas-encapsulated resin is compounded, the flexibility of the tire can be maintained without increasing the hardness of the tire rubber.

EXAMPLES

The present invention will now be further illustrated by, but is by no means limited to, the following Examples.

The following components used in the following Examples and Comparative Examples are as follows:

Diene Rubber

RSS#3: Natural Rubber

NIPOL 1220: BR (Nippon Zeon) (Tg=−101° C.)

NIPOL 1502: SBR (Nippon Zeon) (Tg=−51° C.)

Carbon Black

SHOBLACK N220: Carbon black (Showa Cabot) ($N_2SA$=111 $m^2$/g, DBP oil absorption=111 ml/100 g)

Silica

NIPSIL AQ: Precipitated silica (Nippon Silica Industrial Co., Ltd.)

Thermoplastic Resin Particle

EXPANCEL 091DU-80: Expansible (Non-expanded) Particle (Expancel Co.) (expansion starting temp.= 1.22° C., maximum expansion temp.=176° C.)

MATSUMOTO MICROSPHERE-F-100: Expansible (Non-expanded) Particle (Matsumoto Yushi K.K.) (expansion starting temp.=138° C., maximum expansion temp.=183° C.)

EXPANCEL 091DE-80: Expanded Particle (Expancel Co.)

ALAMIN: Nylon Micro Particles (Toray) SHIRASU BALLOON: Hollow particle (Shirasu Co.)

Short Fiber

UBESHP-HA1060: Nylon 6 fiber/Natural Rubber/Polyethylene Masterbatch (Diameter=0.3 μm, Length=120 μm) (Ube Kosan K.K.)

SANTOWEB-DX: Cellulose Fiber/SBR Masterbatch (Diameter=12 μm, Length=1500 μm) (Flexsis Co.)

Hard Particle

PVDC Particle: Poly(vinylidene chloride) resin (Hv=17) was powdered and fractioned the particles between 100 μm sieve and 45 μm sieve.

Nylon Particle: Nylon 66 resin (Hv=40) was powdered and fractioned the particles between 100 μm sieve and 45 μm sieve.

Wood Ceramic Particle: 100 parts by weight of wood material was impregnated with 100 parts by weight of phenol resin, followed by sintering at 800° C. for 4 hours in a non-oxygen atmosphere. The resultant product was powdered and fractioned the particles between 100 μm sieve and 45 μm sieve (Hv=100)

Other Additives

SANTOFLEX 6PPD: Antioxidant (Flexsis Co.)

Zinc Oxide #3: Seido Chemical Industry

Stearic acid: Nippon Yushi

Process oil: Fuji Kosan K.K.

SANTOCURE NS: Vulcanization Accelerator (Flexsis Co.)

Sulfur: Karuizawa Seirenjyo

Examples 1–7 and Comparative Examples 1–6

These Examples show the evaluation results of the rubber compositions in which the above-mentioned expansible (i.e., non-expanded) or expanded particle was formulated to natural rubber, SBR, or a blend of natural rubber and BR, together with the other conventional compounding agents, followed by heat treatment.

The components shown in Table I were blended in the amounts (parts by weight) shown in Table I. The starting rubber and the compounding agents, except for the vulcanization accelerator, sulfur, and the hollow resin particles, were mixed in a 16 liter Banbury mixer for 5 minutes to obtain a masterbatch. The masterbatch thus obtained was mixed with the other compounding agents in a 16 liter closed type Banbury mixer and the resultant rubber composition was dumped from the Banbury mixer when the temperature of the rubber composition reached 110° C. The rubber composition thus obtained was vulcanized at 160° C. for 20 minutes under a pressure of 10 MPa to provide the test pieces having a thickness of 2 mm and the hardness (Hs) was measured. Furthermore, the rubber composition obtained above was vulcanized at 160° C. for 20 minutes under a pressure of 10 MPa to provide the test pieces having a thickness of 5 mm for a Lambourn abrasion test. The hardness (Hs) of the resultant vulcanizate was as shown in Table I.

On the other hand, the rubber composition was cooled to a room temperature and was extruded from a 3.5 inch φ extruder at a head temperature of 92° C. to form a tread portion, for the manufacture of a tire having a size of 185/65R14 and used for a braking test on ice. The green tire (i.e., the unvulcanized molded tire) was vulcanized at a temperature of 165° C. for 15 minutes in a mold. The results are shown in Table I.

The evaluation methods in each Example are as follows.

(1) Hardness Hs

JIS-K-6301-5.2 (Spring hardness: Type A)

(2) Volume Ratio of Hollow Portion (%)

The volume ratio is calculated from the equation:

$$\frac{1-\rho'}{\rho} \times 100$$

wherein

ρ: the specific gravity of the rubber except for the hollow polymer.

ρ': the specific gravity of the rubber containing the hollow polymer.

Note that the values ρ and ρ' were determined by a balance method according to JIS-K-0061-5.1.

(3) Lambourn Abrasion

A Lambourn abrasion tester (manufactured by Iwamoto Seisakusho) was used to measure the loss of weight due to wear under conditions of a temperature of 20° C. and a slippage of 50% according to JIS-K-6264-7. The results were indicated indexed to Comparative Example 1 as 100. The larger the value, the better the abrasion resistance.

(4) Braking on Ice

New four tires provided at a passenger car having an exhaust capacity of 1800 cc were run at an initial speed of 40 km/h on ice sheets at an atmosphere temperature of −5° C. and then braked to measure the braking distance. The results were indicated indexed to Comparative Example 3 as 100. The larger the value, the better the braking distance.

As is clear from the results shown in Table I, the rubber compositions according to the present invention have excellent elasticity and flexibility, and therefore, when these compositions are used for tire treads, the abrasion resistance on ice is excellent when compared with the use of the conventional nylon 1 microparticle and Shirasu baloon.

TABLE I

| | Comparative Example | | | | Example | | | | Comp. Example | Example | Comp. Example | Example | |
|---|---|---|---|---|---|---|---|---|---|---|---|---|---|
| | 1 | 2 | 3 | 4 | 1 | 2 | 3 | 4 | 5 | 5 | 6 | 6 | 7 |
| Compounding (Wt. Part) | | | | | | | | | | | | | |
| RSS#3 | 50 | 50 | 50 | 50 | 50 | 50 | 50 | 50 | 50 | 100 | — | — | 50 |
| NIPOL 1220 | 50 | 50 | 50 | 50 | 50 | 50 | 50 | 50 | 50 | — | — | — | 50 |
| NIPOL 1502 | — | — | — | — | — | — | — | — | — | — | 100 | 100 | — |
| SHOBLACK N220 | 55 | 55 | 55 | 55 | 55 | 55 | 55 | 55 | 55 | 55 | 55 | 55 | 40 |
| NIPSIL AQ | — | — | — | — | — | — | — | — | — | — | — | — | 15 |
| SANTOFLEX6PPD | 1 | 1 | 1 | 1 | 1 | 1 | 1 | 1 | 1 | 1 | 1 | 1 | 1 |
| Zinc Oxide #3 | 3 | 3 | 3 | 3 | 3 | 3 | 3 | 3 | 3 | 3 | 3 | 3 | 3 |
| Stearic acid | 1 | 1 | 1 | 1 | 1 | 1 | 1 | 1 | 1 | 1 | 1 | 1 | 1 |
| Process oil | 30 | 30 | 30 | 30 | 30 | 30 | 30 | 30 | 30 | 30 | 30 | 30 | 30 |
| SANTOCURE NS | 1.5 | 1.5 | 1.5 | 1.5 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 | 2 | 2 | 2 | 2 |
| EXPANCEL 091DU-80 | — | — | — | — | 5 | 10 | — | 15 | 25 | 10 | — | 10 | 10 |
| MATSUMOTO MICROSPHERE F100 | — | — | — | — | — | — | 10 | — | — | — | — | — | — |
| EXPANCEL 091DE-80 | — | — | — | 5 | — | — | — | — | — | — | — | — | — |
| Nylon Powder | — | 5 | — | — | — | — | — | — | — | — | — | — | — |
| Shirasu Baloon | — | — | 5 | — | — | — | — | — | — | — | — | — | — |
| Evaluation Result | | | | | | | | | | | | | |
| Ave. Tg (° C.) | −86 | −86 | −86 | −86 | −86 | −86 | −86 | −86 | −86 | −71 | −51 | −51 | −86 |
| Hs | 50 | 60 | 59 | 50 | 50 | 50 | 49 | 49 | 48 | 51 | 53 | 51 | 50 |
| Volume Ratio (%) of Hollow Portion | 0 | 0 | 2.04 | 3.74 | 8.5 | 19.4 | 14.1 | 28.1 | 39.2 | 18.7 | 0 | 19.1 | 18.1 |
| Lambourn Abrasion (Index) | 100 | 72 | 74 | 88 | 87 | 75 | 76 | 68 | 48 | 72 | 92 | 70 | 73 |
| Actual Braking Distance (Index) | 100 | 99 | 98 | 98 | 89 | 78 | 82 | 71 | 63 | 86 | 116 | 98 | 78 |

Examples 8–14 and Comparative Examples 7–13

The components shown in Table II were blended in the amounts (parts by weight) shown in Table II. The starting rubber and the compounding agents, except for the vulcanization accelerator, sulfur, and the hollow resin particles, were mixed in a 16 liter Banbury mixer for 5 minutes to obtain a masterbatch. The masterbatch thus obtained was mixed with the other compounding agents in a 16 liter closed type Banbury mixer and the resultant rubber composition was dumped from the Banbury mixer when the temperature of the rubber composition reached 110° C.

On the other hand, the rubber composition was cooled to a room temperature and was extruded from a 3.5 inch φ extruder at a head temperature of 92° C. to form a tread portion, for the manufacture of a tire having a size of 185/65R14 and used for a braking test on ice. The green tire was vulcanized at a temperature of 165° C. for 15 minutes in a mold. The results are shown in Table II.

The evaluation method in each Example is as follows.

(1) Volume Ratio of Hollow Portion (%)

The volume ratio is calculated from the equation:

$$\frac{1-\rho'}{\rho} \times 100$$

wherein

ρ: the specific gravity of the rubber except for the hollow polymer.

ρ': the specific gravity of the rubber containing the hollow polymer.

Note that the values ρ and ρ' were determined by a balance method according to JIS-K-0061-5.1.

(2) Braking on Ice

New four tires provided at a passenger car having an exhaust capacity of 1800 cc were run at an initial speed of 40 km/h on ice sheets at an atmosphere temperature of −5° C. and then braked to measure the braking distance. The results were indicated indexed to Comparative Example 7 as 100. The larger the value, the better the braking distance.

As is clear from the results shown in Table II, the rubber compositions according to the present invention provides the pneumatic tire having excellent abrasion resistance on ice, when the compositions are used for tire treads, when compared with the conventional tire.

TABLE II

| | Comparative Example | | | | | Example | | | | | | Comp Example | | Example |
|---|---|---|---|---|---|---|---|---|---|---|---|---|---|---|
| | 7 | 8 | 9 | 10 | 11 | 8 | 9 | 10 | 11 | 12 | 13 | 12 | 13 | 14 |
| Compounding (Wt. Part) | | | | | | | | | | | | | | |
| RSS#3 | 50 | 50 | 50 | 50 | 50 | 50 | 50 | 50 | 50 | 50 | 50 | — | — | — |
| NIPOL 1220 | 50 | 50 | 50 | 50 | 50 | 50 | 50 | 50 | 50 | 50 | 50 | — | — | — |
| NIPOL 1502 | — | — | — | — | — | — | — | — | — | — | — | 100 | 100 | 100 |
| SHOBLACK N220 | 55 | 55 | 55 | 55 | 55 | 55 | 55 | 55 | 55 | 55 | 40 | 55 | 55 | 55 |
| NIPSIL AQ | — | — | — | — | — | — | — | — | — | — | 15 | — | — | — |
| SANDTOFLEX 6PPD | 1 | 1 | 1 | 1 | 1 | 1 | 1 | 1 | 1 | 1 | 1 | 1 | 1 | 1 |
| Zinc Oxide #3 | 3 | 3 | 3 | 3 | 3 | 3 | 3 | 3 | 3 | 3 | 3 | 3 | 3 | |
| Stearic acid | 1 | 1 | 1 | 1 | 1 | 1 | 1 | 1 | 1 | 1 | 1 | 1 | 1 | 1 |
| Process oil | 30 | 30 | 30 | 30 | 30 | 30 | 30 | 30 | 30 | 30 | 30 | 30 | 30 | 30 |
| SANTOCURE NS | 1.5 | 1.5 | 1.5 | 1.5 | 1.5 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 | 2 | 2 | 2 | 2 | 2 |
| EXPANCEL 091DU-80 | — | — | — | — | 5 | 5 | 5 | 5 | — | 10 | 10 | 10 | — | 10 | 10 |
| MATSUMOTO MICROSPHERE F100 | — | — | — | — | — | — | — | 5 | — | — | — | — | — | — |
| EXPANCEL 091DE-80 | — | — | — | 5 | — | — | — | — | — | — | — | — | — | — |
| UBESHP-HA1O6O | — | 3 | — | — | — | 3 | — | 3 | 3 | 5 | 3 | — | — | 3 |
| SANTOWEB-DX | — | — | 3 | — | — | — | 3 | — | — | — | — | — | — | — |
| Evaluation Result | | | | | | | | | | | | | | |
| Volume Ratio (%) of Hollow Portion | 0 | 0 | 0 | 4.74 | 8.50 | 8.35 | 8.41 | 8.49 | 19.25 | 19.11 | 17.89 | 0 | 19.1 | 18.9 |
| Actual Braking Distance (Index) | 100 | 96 | 97 | 98 | 89 | 80 | 82 | 79 | 73 | 70 | 73 | 116 | 98 | 92 |

Examples 15–21 and Comparative Examples 14–20

The components shown in Table III were blended in the amounts (parts by weight) shown in Table III. The starting rubber and the compounding agents, except for the vulcanization accelerator, sulfur, and the hollow resin particles, were mixed in a 16 liter Banbury mixer for 5 minutes to obtain a masterbatch. The masterbatch thus obtained was mixed with the other compounding agents in a 16 liter closed type Banbury mixer and the resultant rubber composition was dumped from the Banbury mixer when the temperature of the rubber composition reached 110° C. The rubber compositions thus obtained were used, as a tread portion, for the manufacture of a tire having a size of 185/65R14 and used for a braking test on ice. The results are shown in Table III. The evaluation method is as follows.

(1) Braking on Ice

New four tires provided at a passenger car having an exhaust capacity of 1800 cc were run at an initial speed of 40 km/h on ice sheets at an atmosphere temperature of −5° C. and then braked to measure the braking distance. The results were indicated indexed to Comparative Example 14 as 100. The larger the value, the better the braking distance.

As is clear from the results shown in Table III, the rubber compositions according to the present invention provide excellent abrasion resistance on ice, when these compositions are used for tire treads, when compared with the conventional tire.

TABLE III

| | Comparative Example | | | | | Example | | | | | | Comp Example | | Example |
|---|---|---|---|---|---|---|---|---|---|---|---|---|---|---|
| | 14 | 15 | 16 | 17 | 18 | 15 | 16 | 17 | 18 | 19 | 20 | 19 | 20 | 21 |
| Compounding (Wt. Part) | | | | | | | | | | | | | | |
| RSS#3 | 50 | 50 | 50 | 50 | 50 | 50 | 50 | 50 | 50 | 50 | 50 | — | — | — |
| NIPOL 1220 | 50 | 50 | 50 | 50 | 50 | 50 | 50 | 50 | 50 | 50 | 50 | — | — | — |
| NIPOL 1502 | — | — | — | — | — | — | — | — | — | — | — | 100 | 100 | 100 |
| SHOBLACK N220 | 55 | 55 | 55 | 55 | 55 | 55 | 55 | 55 | 55 | 55 | 40 | 55 | 55 | 55 |
| NIPSIL AQ | — | — | — | — | — | — | — | — | — | — | 15 | — | — | — |
| SANTOFLEX6PPD | 1 | 1 | 1 | 1 | 1 | 1 | 1 | 1 | 1 | 1 | 1 | 1 | 1 | 1 |
| Zinc Oxide #3 | 3 | 3 | 3 | 3 | 3 | 3 | 3 | 3 | 3 | 3 | 3 | 3 | 3 | 3 |
| Stearic acid | 1 | 1 | 1 | 1 | 1 | 1 | 1 | 1 | 1 | 1 | 1 | 1 | 1 | 1 |

TABLE III-continued

| | Comparative Example | | | | | Example | | | | | | Comp Example | | Example |
|---|---|---|---|---|---|---|---|---|---|---|---|---|---|---|
| | 14 | 15 | 16 | 17 | 18 | 15 | 16 | 17 | 18 | 19 | 20 | 19 | 20 | 21 |
| Aromatic oil | 30 | 30 | 30 | 30 | 30 | 30 | 30 | 30 | 30 | 30 | 30 | 30 | 30 | 30 |
| SANTOCURE NS | 1.5 | 1.5 | 1.5 | 1.5 | 1.5 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 | 2 | 2 | 2 | 2 | 2 |
| EXPANCEL 091DU-80 | — | — | — | 5 | 5 | 5 | 5 | — | 10 | 10 | 10 | — | 10 | 10 |
| MATSUMOTO MICROSPHERE F100 | — | — | — | — | — | — | — | 5 | — | — | — | — | — | — |
| PVDC Particle | — | — | — | — | 3 | — | — | — | — | — | — | — | — | — |
| Nylon Particle | — | 3 | — | — | — | 3 | — | — | — | — | — | — | — | — |
| Wood Ceramic Particle | — | — | 3 | — | — | — | 3 | 3 | 3 | 5 | 3 | — | — | 3 |
| Evaluation Result | | | | | | | | | | | | | | |
| Volume Ratio (%) of Hollow Portion | 0 | 0 | 0 | 8.5 | 8.42 | 8.40 | 8.39 | 8.46 | 19.22 | 19.17 | 17.96 | 0 | 19.1 | 18.8 |
| Actual Braking Distance (Index) | 100 | 97 | 91 | 89 | 89 | 84 | 76 | 77 | 70 | 72 | 70 | 116 | 98 | 89 |

We claim:

1. A rubber composition in a tire tread for a pneumatic tire comprising:
   (i) 100 parts by weight of a diene rubber selected from the group consisting of natural rubber (NR), butadiene rubbers (BR), styrene-butadiene copolymer rubbers (SBR) and polyisoprene rubbers (IR), and
   (ii) 1 to 20 parts by weight of an elastic gas-encapsulated thermoplastic resin hollow particle having a particle size of 5–300 $\mu$m, which is obtained by expanding, upon heating during vulcanization of the diene rubber with sulfur, a thermally expansible thermoplastic resin containing an encapsulated liquid or solid substance capable of generating a gas by vaporization, decomposition or chemical reaction upon heating to form the hollow-type expanded particle.

2. A rubber composition as claimed in claim 1, wherein a volume ratio of the hollow portion of the gas-encapsulated thermoplastic resin hollow particle is 5–35%, based on the volume of the rubber composition.

3. A rubber composition as claimed in claim 1, wherein the diene rubber has an average glass transition temperature (Tg) of −55° C. or less.

4. A rubber composition as claimed in claim 1, further comprising (a) 20 to 80 parts by weight of a carbon black having a nitrogen adsorption specific surface area ($N_2SA$) of 70 $m^2$/g or more and a DBP oil absorption of 105 ml/100 g or more and (b) 0 to 50 parts by weight of a precipitated silica, both based upon 100 parts by weight of the diene rubber.

5. A rubber composition as claimed in claim 1, further comprising (iii) 1 to 20 parts by weight, based on 100 parts by weight of the diene rubber, of a short fiber having an average diameter of 0.1 $\mu$m or more and an average length of 50 to 5000 $\mu$m.

6. A rubber composition as claimed in claim 5, wherein a volume ratio of the hollow portion of the gas-encapsulated thermoplastic resin hollow particle is 5–35%.

7. A rubber composition as claimed in claim 5, wherein the diene rubber has an average glass transition temperature (Tg) of −55° C. or less.

8. A rubber composition as claimed in claim 5, further comprising (a) 20 to 80 parts by weight of a carbon black having a nitrogen adsorption specific surface area ($N_2SA$) of 70 $m^2$/g or more and a DBP oil absorption of 105 ml/100 g or more and (b) 0 to 50 parts by weight of a precipitated silica, both based upon 100 parts by weight of the diene rubber.

9. A rubber composition as claimed in claim 1 or 5, further comprising (iv) 1 to 20 parts by weight, based on 100 parts by weight of the diene rubber, of a hard particle having a Vickers hardness of 35–1000 and a particle size of 20–500 $\mu$m.

10. A rubber composition as claimed in claim 9, wherein the diene rubber has an average glass transition temperature (Tg) of −55° C. or less.

11. A rubber composition as claimed in claim 9, further comprising (a) 20 to 80 parts by weight of a carbon black having a nitrogen adsorption specific surface area ($N_2SA$) of 70 $m^2$/g or more and a DBP oil absorption of 105 ml/100 g or more and (b) 0 to 50 parts by weight of a precipitated silica, both based upon 100 parts by weight of the diene rubber.

12. A process for producing a rubber composition in a tire tread for a pneumatic tire comprising the steps of:
   uniformly mixing a diene rubber selected from the group consisting of natural rubber (NR), butadiene rubbers (BR), styrene-butadiene copolymer rubbers (SBR) and polyisoprene rubbers (IR) with a thermally expansible thermoplastic resin particle containing an encapsulated liquid or solid substance capable of generating a gas by evaporation, decomposition or chemical reaction upon heating, at a temperature of less than an expansion starting temperature; and
   heating the resultant mixture at a temperature of the expansion starting temperature of the expansible thermoplastic resin particle to form an elastic gas-encapsulated expanded thermoplastic resin hollow particle according to claim 1 having a particle size of 5–300 $\mu$m uniformly dispersed in the rubber.

13. A pneumatic tire, in which a tread portion thereof is composed of a rubber composition according to claim 1.

14. A pneumatic tire, in which a tread portion thereof is composed of a rubber composition according to claim 5, the short fiber being oriented along with the front surface and the side surface of a block of the tread portion.

15. A pneumatic tire, in which a tread portion thereof is composed of a rubber composition according to claim 9.

* * * * *